United States Patent
Wolfson et al.

(10) Patent No.: US 8,417,630 B2
(45) Date of Patent: Apr. 9, 2013

(54) SYSTEMS AND METHODS FOR DEPOSIT PREDICTIONS BASED UPON TEMPLATE MATCHING

(75) Inventors: Steven Wolfson, Scituate, MA (US); Igor Ofenbakh, Morristown, NJ (US)

(73) Assignee: Fiserv, Inc., Brookfield, WI (US)

( * ) Notice: Subject to any disclaimer, the term of this patent is extended or adjusted under 35 U.S.C. 154(b) by 498 days.

(21) Appl. No.: 12/408,521

(22) Filed: Mar. 20, 2009

(65) Prior Publication Data

US 2010/0241487 A1 Sep. 23, 2010

(51) Int. Cl.
*G06Q 40/00* (2012.01)
(52) U.S. Cl.
USPC .................. 705/39; 705/14.17; 705/14.53
(58) Field of Classification Search ............... 705/35–45
See application file for complete search history.

(56) References Cited

U.S. PATENT DOCUMENTS

| | | | |
|---|---|---|---|
| 6,725,210 B1 | 4/2004 | Key et al. | |
| 7,284,692 B1 * | 10/2007 | Douglass | 235/379 |
| 7,505,931 B2 | 3/2009 | Da Silva | |
| 7,526,446 B2 | 4/2009 | Aguais et al. | |
| 7,970,698 B2 * | 6/2011 | Gupta et al. | 705/38 |
| 2004/0073505 A1 | 4/2004 | Wright | |
| 2007/0262137 A1 | 11/2007 | Brown | |
| 2008/0140468 A1 * | 6/2008 | Ramsey et al. | 705/7 |

OTHER PUBLICATIONS

Non-Final Office Action for U.S. Appl. No. 12/408,544 mailed Jun. 15, 2011.
Non-Final Office Action for U.S. Appl. No. 12/408,544 mailed Nov. 28, 2011.

* cited by examiner

*Primary Examiner* — Thomas M Hammond, III
(74) *Attorney, Agent, or Firm* — Sutherland Asbill & Brennan LLP

(57) ABSTRACT

Systems and methods may be provided for deposit prediction based upon template matching. The system and methods may include receiving deposit information associated with a plurality of deposits for a deposit account of a financial institution customer, where the deposit information includes a plurality of deposit amounts, and a respective date associated with each of the plurality deposit amounts; identifying, based upon the received deposit information, one or more deposit patterns by applying one or more template patterns to the deposit information and determining that one or more of the applied template patterns match at least a portion of the deposit information; and generating an indication of the identified one or more deposit patterns.

31 Claims, 13 Drawing Sheets

SYSTEMS AND METHODS FOR DEPOSIT PREDICTIONS BASED UPON TEMPLATE MATCHING

FIELD OF THE INVENTION

Aspects of the invention relate generally to deposit predictions, and more particularly to systems and methods for deposit predictions based upon historical deposit information.

BACKGROUND OF THE INVENTION

Deposits into Demand Deposit Accounts or other bank accounts can include one or both of electronic deposits or non-electronic deposits. Electronic deposits are typically ACH credits processed through a clearing house network. Non-electronic deposits include ATM or teller-initiated deposits in the form of paper instruments such as checks or currencies such as cash.

One or more of financial institutions, financial services companies, and other service providers can provide or initiate one or more services based upon knowledge of a predicted deposit amount and/or date. Accordingly, there is a need in the industry for deposit prediction based upon available deposit information.

SUMMARY OF THE INVENTION

Embodiments of the invention may provide for deposit prediction based upon historical deposit information. According to an example embodiment of the invention, there may be a method. The method may include receiving deposit information associated with a plurality of deposits for a deposit account of a financial institution customer, where the deposit information includes a plurality of deposit amounts, and a respective date associated with each of the plurality deposit amounts; identifying, based upon the received deposit information, one or more deposit patterns by applying one or more template patterns to the deposit information and determining that one or more of the applied template patterns match at least a portion of the deposit information; and generating an indication of the identified one or more deposit patterns.

According to another example embodiment of the invention, there may be a system. The system may include a system. The system may include a memory that stores computer-executable instructions, and a processor configured to access the memory. The processor may be further configured to execute the computer-executable instructions to: receive deposit information associated with a plurality of deposits for a deposit account of a financial institution customer, where the deposit information includes a plurality of deposit amounts, and a respective date associated with each of the plurality deposit amounts; identify, based upon the received deposit information, one or more deposit patterns by applying one or more template patterns to the deposit information and determining that one or more of the applied template patterns match at least a portion of the deposit information; and generate an indication of the identified one or more deposit patterns.

According to yet another example embodiment of the invention, there may be another system. The system may include means for receiving deposit information associated with a plurality of deposits for a deposit account of a financial institution customer, where the deposit information includes a plurality of deposit amounts, and a respective date associated with each of the plurality deposit amounts; means for identifying, based upon the received deposit information, one or more deposit patterns by applying one or more template patterns to the deposit information and determining that one or more of the applied template patterns match at least a portion of the deposit information; and means for generating an indication of the identified one or more deposit patterns.

BRIEF DESCRIPTION OF THE DRAWINGS

Reference will now be made to the accompanying drawings, which are not necessarily drawn to scale, and wherein.

DETAILED DESCRIPTION

The invention will now be described more fully hereinafter with reference to the accompanying drawings, in which example embodiments of the invention are shown. This invention may, however, be embodied in many different forms and should not be construed as limited to the example embodiments set forth herein; rather, these example embodiments are provided so that this disclosure will be thorough and complete, and will fully convey the scope of the invention to those of ordinary skill in the art. Like numbers refer to like elements throughout.

Embodiments of the invention may provide for deposit prediction based upon available deposit information (e.g., deposit information associated with a Demand Deposit Account (DDA) or other bank account). The predicted next deposit date(s) and amount(s) may be utilized by one or more financial institutions, financial services companies, or other service providers to provide, initiate, direct, or offer one or more services, as described herein.

I. System Overview

Figure 1A:
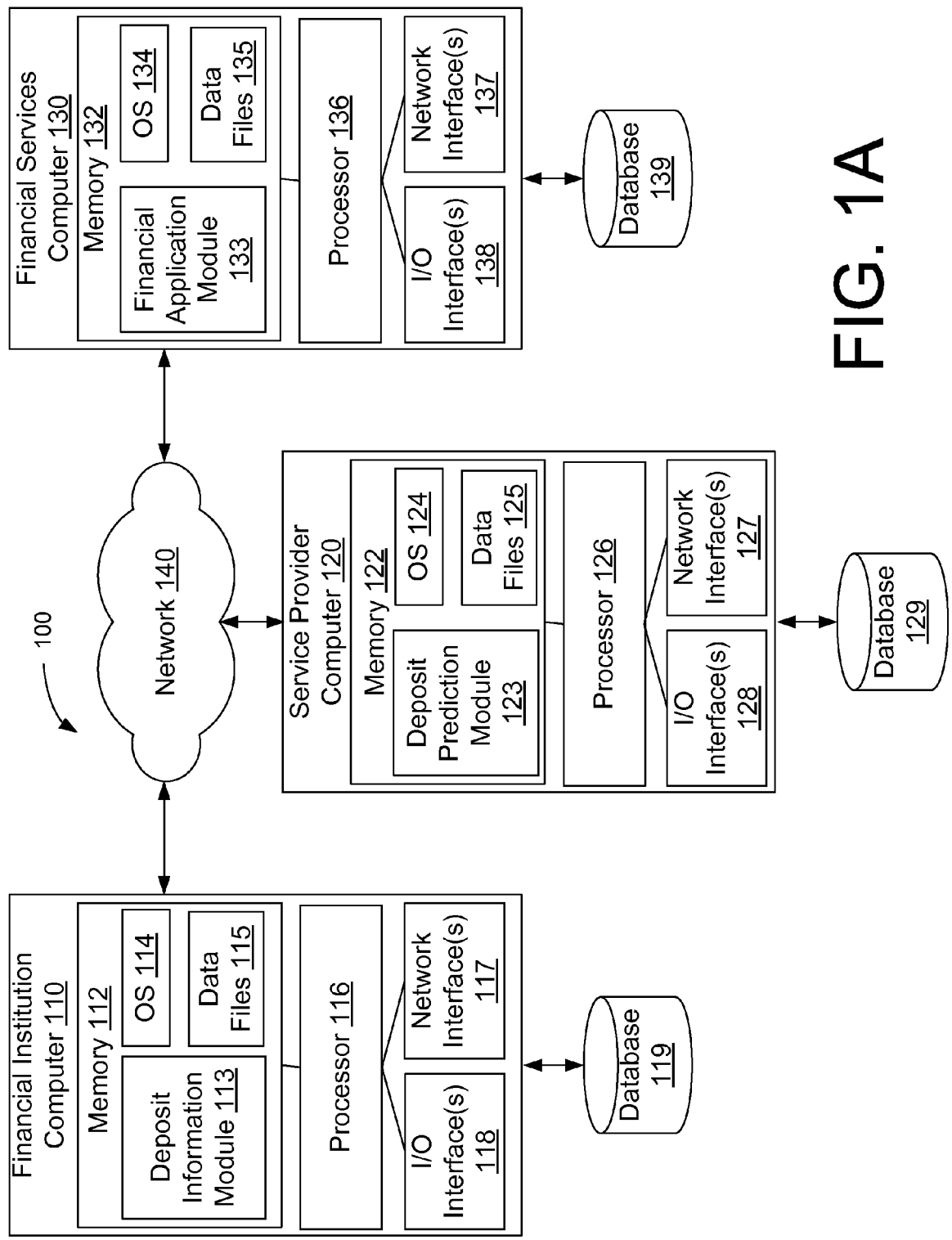
FIG. 1A illustrates an overview of an example system for deposit prediction, according to an example embodiment of the invention.

FIG. 1A illustrates an example system 100 for deposit prediction, according to an example embodiment of the invention. As shown in FIG. 1A, a financial institution computer 110, service provider computer 120, and financial services computer 130 may be in communication with each other via a network 140, which, as described below, can include one or more separate or shared private and/or public networks, including the Internet or a publicly switched telephone network. Each of these components—the financial institution computer 110, the service provider computer 120, the financial services computer 130, and the network 140—will now be discussed in further detail.

First, the financial institution computer 110 may be any processor-driven device, such as, but not limited to, a server computer, a mainframe computer, one or more networked computers, a desktop computer, a personal computer, a laptop computer, a mobile computer, or any other processor-based device. In addition to having a processor 116, the financial institution computer 110 may further include a memory 112, input/output ("I/O") interface(s) 118, and network interface(s) 117. The memory 112 may be any computer-readable medium, coupled to the processor 116, such as RAM, ROM, and/or a removable storage device for storing data files 115 and a database management system ("DBMS") to facilitate management of data files 115 and other data stored in the memory 112 and/or stored in a separate database 119. The memory 112 may also store various program modules, such as an operating system ("OS") 114 and a deposit information module 113. The OS 114 may be, but is not limited to, Microsoft Windows®, Apple OSX™, Unix, a mainframe computer operating system (e.g., IBM z/OS, MVS, OS/390 earlier, etc.), or a specially designed operating system. The deposit information module 113 may comprise computer-executable program instructions or software, including a dedicated program, for managing, storing, or extracting deposit account information of one or more financial institution customers.

Still referring to the financial institution computer 110, the I/O interface(s) 118 may facilitate communication between the processor 116 and various I/O devices, such as a keyboard, mouse, printer, microphone, speaker, monitor, bar code readers/scanners, RFID readers, and the like. The network interface(s) 117 may take any of a number of forms, such as, but not limited to, a network interface card, a modem, a wireless network card, a cellular network card, and the like. Indeed, the financial institution computer 110 can receive deposit information via network interface(s) 117 and additionally transmit deposit information, perhaps to service provider computer 120, via network interface 117. It will be appreciated that financial institution computer 110 may be implemented on a particular machine, which may include a computer that is designed, customized, configured, or programmed to perform at least one or more functions of the deposit information module 113, according to an example embodiment of the invention.

Second, the service provider computer 120 may be any processor-driven device, such as, but not limited to, a server computer, a mainframe computer, one or more networked computers, a desktop computer, a personal computer, a laptop computer, a mobile computer, or any other processor-based device. In addition to having a processor 126, the service provider computer 120 may further include a memory 122, input/output ("I/O") interface(s) 128, and network interface(s) 127. The memory 122 may be any computer-readable medium, coupled to the processor 126, such as RAM, ROM, and/or a removable storage device for storing data files 125 and a database management system ("DBMS") to facilitate management of data files 125 and other data stored in the memory 122 and/or stored in a separate database 129. The memory 122 may also store various program modules, such as an operating system ("OS") 124 and a deposit prediction module 123. The OS 124 may be, but is not limited to, Microsoft Windows®, Apple OSX™, Unix, a mainframe computer operating system (e.g., IBM z/OS, MVS, OS/390 earlier, etc.), or a specially designed operating system. The deposit prediction module 123 may comprise computer-executable program instructions or software, including a dedicated program, for determining, based upon an analysis of deposit information, a date and/or amount of one or more next deposits.

Still referring to the service provider computer 120, the I/O interface(s) 128 may facilitate communication between the processor 126 and various I/O devices, such as a keyboard, mouse, printer, microphone, speaker, monitor, bar code readers/scanners, RFID readers, and the like. The network interface(s) 127 may take any of a number of forms, such as, but not limited to, a network interface card, a modem, a wireless network card, a cellular network card, and the like. Indeed, the service provider computer 120 can receive deposit information from financial institution computer 110 via network interface(s) 127, and additionally transmit deposit prediction information, perhaps to financial services computer 130, via network interface(s) 127. It will be appreciated that service provider computer 120 may be implemented on a particular machine, which may include a computer that is designed, customized, configured, or programmed to perform at least one or more functions of the deposit prediction module 123, according to an example embodiment of the invention.

Third, the financial services computer 130 may be any processor-driven device, such as, but not limited to, a server computer, a mainframe computer, one or more networked computers, a desktop computer, a personal computer, a laptop computer, a mobile computer, or any other processor-based device. In addition to having a processor 136, the financial services computer 130 may further include a memory 132, input/output ("I/O") interface(s) 138, and network interface(s) 137. The memory 132 may be any computer-readable medium, coupled to the processor 136, such as RAM, ROM, and/or a removable storage device for storing data files 135 and a database management system ("DBMS") to facilitate management of data files 135 and other data stored in the memory 132 and/or stored in a separate database 139. The memory 132 may also store various program modules, such as an operating system ("OS") 134 and a financial application module 133. The OS 134 may be, but is not limited to, Microsoft Windows®, Apple OSX™, Unix, a mainframe computer operating system (e.g., IBM z/OS, MVS, OS/390 earlier, etc.), or a specially designed operating system. The financial application module 133 may comprise computer-executable program instructions or software, including a dedicated program, for determining, based upon a date and/or amount of one or more next deposits, whether or the extent to which to provide, initiate, or offer one or more services.

Still referring to the financial services computer 130, the I/O interface(s) 138 may facilitate communication between the processor 136 and various I/O devices, such as a keyboard, mouse, printer, microphone, speaker, monitor, bar code readers/scanners, RFID readers, and the like. The network interface(s) 137 may take any of a number of forms, such as, but not limited to, a network interface card, a modem, a wireless network card, a cellular network card, and the like. Indeed, the financial services computer 130 can receive deposit prediction information from the service provider computer 120 via network interface(s) 137. It will be appreciated that financial services computer 130 may be implemented on a particular machine, which may include a computer that is designed, customized, configured, or programmed to perform at least one or more functions of the financial application module 133, according to an example embodiment of the invention.

The network 140 may include any telecommunication and/or data network, whether public, private, or a combination thereof, including a local area network, a wide area network, an intranet, an internet, the Internet, intermediate hand-held data transfer devices, a publicly switched telephone network ("PSTN"), a cellular network, and/or any combination thereof and may be wired and/or wireless. The network 140 may also allow for real-time, off-line, and/or batch transactions to be transmitted between or among the financial institution computer 110, the service provider computer 120, and/or the financial services computer 130. Due to network connectivity, various methodologies as described herein may be practiced in the context of distributed computing environments. It will also be appreciated that the network 140 may include a plurality of networks, each with devices such as gateways and routers for providing connectivity between or among networks 140. Instead of, or in addition to, a network 140, dedicated communication links may be used to connect the various devices in accordance with an example embodiment invention.

Generally, each of the memories and data storage devices, such as the memories 112, 122, 132 and the databases 119, 129, 139, and/or any other memory and data storage device, can store data and information for subsequent retrieval. In this manner, the system 100 can store various received or collected information in memory or a database associated with one or more financial institution computers 110, service provider computers 120, and/or financial services computers 130. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices. In an example embodiment, for security, the financial institution computer 110, service provider computer 120, and financial services computer 130 may have a dedicated connection to respective databases 119, 129, 139, as shown; though, in other embodiments, the financial institution computer 110, service provider computer 120, and financial services computer 130 or any other entity may communicate with the databases 119, 129, 139, or another database via a network 140.

Suitable processors, such as the processors 116, 126, 136 of the financial institution computer 110, service provider computer 120, and/or financial services computer 130, respectively, may comprise a microprocessor, an ASIC, and/or state machine. Example processors can be those provided by Intel Corporation (Santa Clara, Calif.), AMD Corporation (Sunnyvale, Calif.), and Motorola Corporation (Schaumburg, Ill.). Such processors comprise, or may be in communication with media, for example computer-readable media, which stores instructions that, when executed by the processor, cause the processor to perform the elements described herein. Embodiments of computer-readable media include, but are not limited to, an electronic, optical, magnetic, or other storage or transmission device capable of providing a processor with computer-readable instructions. Other examples of suitable media include, but are not limited to, a floppy disk, pen drive, CD-ROM, DVD, magnetic disk, memory chip, ROM, RAM, a configured processor, all optical media, all magnetic tape or other magnetic media, or any other medium from which a computer processor can read instructions. Also, various other forms of computer-readable media may transmit or carry instructions to a computer, including a router, gateway, private or public network, or other transmission device or channel, both wired and wireless. The instructions may comprise code from any computer-programming language, including, but not limited to, assembly, C, C++, C#, Visual Basic, Java, Python, Perl, JavaScript, GPSS, LISP, SAS.

Figure 1B:
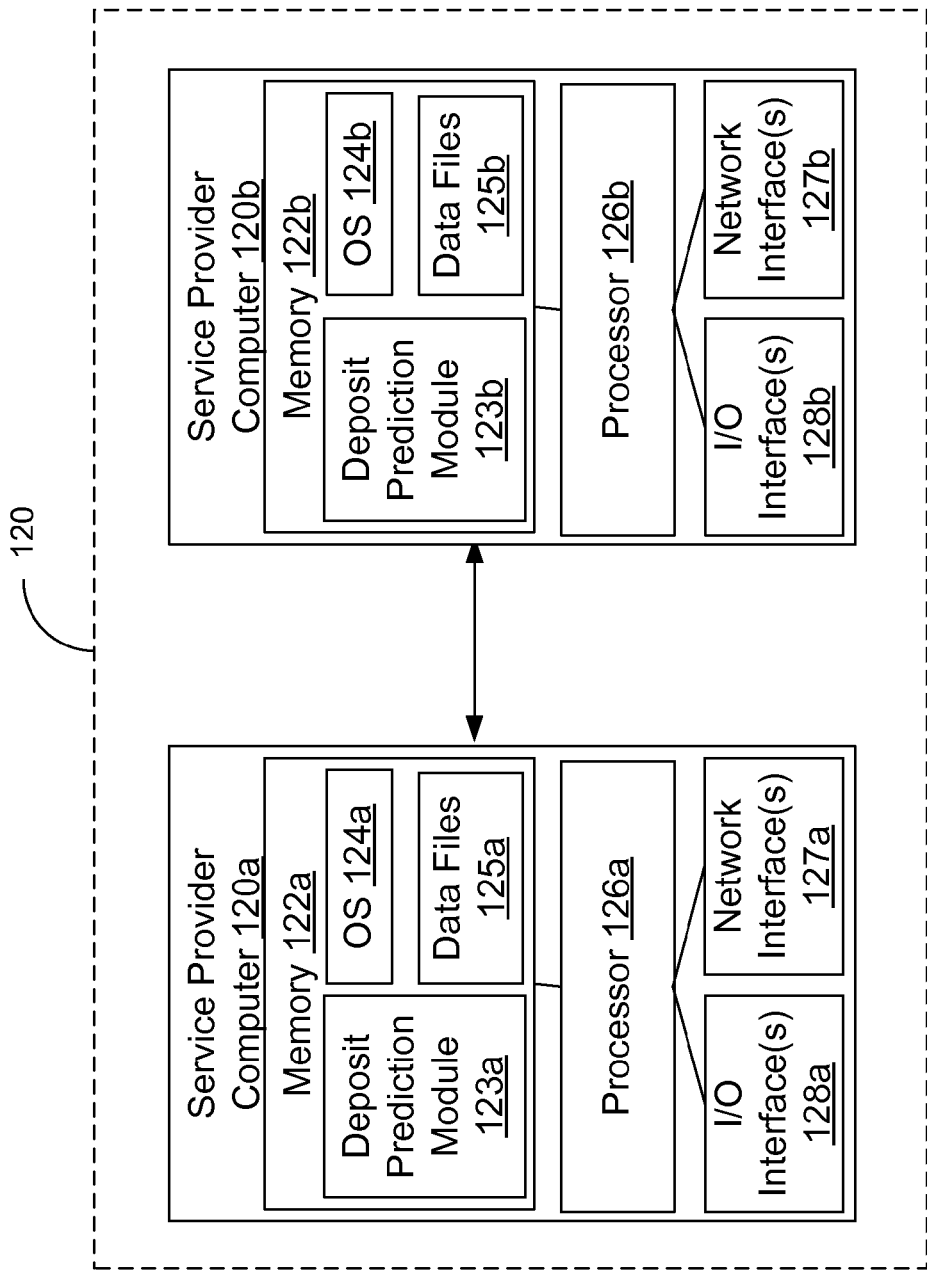
FIG. 1B illustrates an example service provider computer that may be implemented by a plurality of computers, according to an example embodiment of the invention.

The system 100 shown in and described with respect to FIG. 1A is provided by way of example only. Numerous other operating environments, system architectures, and device configurations are possible. Other system embodiments can include fewer or greater numbers of components and may incorporate some or all of the functionality described with respect to the system components shown in FIG. 1A. As an example, there may be an additional computer operable with the system 100 of FIG. 1A, where the computer may provide software updates, including performance enhancement updates, to the deposit prediction module 123. According to another example, the service provider computer 120 may be implemented by a plurality of computers, including a first service provider computer 120a and a second service provider computer 120b, as illustrated by FIG. 1B. Indeed, as shown in FIG. 1B, there may be a first deposit prediction module 123a and a second deposit prediction module 123b. For redundant or parallel processing, the first deposit prediction module 123a may be substantially the same as the second deposit prediction module 123b. For distributed processing, the functionality deposit prediction module 123 for FIG. 1A may be provided or divided according to the first deposit prediction module 123a and the second deposit prediction module 123b. It will be appreciated that the redundant or parallel processing, and/or the distributed processing, illustrated by FIG. 1B can likewise be similarly applied to the financial institution computer 110 and the financial services computer 130. Similar to service provider computer 120 of FIG. 1A, the first and second service computers 120a, 120b of FIG. 1B can each include a processor 126a, 126b, a memory 122a, 122b storing an OS 124a, 124b, a data files 125a, 125b, an input/output ("I/O") interface(s) 128a, 128b, and a network interface(s) 127a, 127b.

Moreover, it will be appreciated that while FIG. 1A illustrates the financial institution computer 110, the service provider computer 120, and the financial services computer 130 as distinct computers, the functionality of two or more of those computers may be combined. For example, all of the deposit information module 113, the deposit prediction module 123, and the financial application module 133 may be provided by a single computer. According to another example, the deposit information module 113 and the financial application module 133 may be provided by a first computer while the deposit prediction module 123 may be provided by a second computer. According to yet another example, the deposit information module 113 and the deposit prediction module 123 may be provided by a first computer while the financial application module 133 may be provided by a second computer. Many variations are available without departing from example embodiments of the invention.

II. Operational Overview

Embodiments of the invention may provide for deposit prediction based upon available deposit information. The deposit information may include electronic deposit information as well as non-electronic deposit information. Examples of electronic deposit information may include, but are not limited to, Automated Clearing House (ACH) deposits. Examples of non-electronic deposits may include, but are not limited to, deposits (e.g., paper deposits) made at a teller, ATM, lockbox, or after hour deposit facility, where deposit amounts may include an aggregate of one or more checks, currencies, or coins.

As will be described herein, there may be at least two types of deposit prediction methodologies utilized in accordance with example embodiments of the invention—(1) template matching or (2) Monte Carlo analysis. Template matching may be utilized to provide, but is not limited to, deposit prediction based upon at least electronic deposit information while the Monte Carlo analysis may be utilized to provide, but is also not limited to, deposit prediction based upon at least non-electronic deposit information. However, it will be appreciated that in other example embodiments, the template matching may also be applied to non-electronic deposit information as well as a combination of electronic and non-electronic deposit information as well. Likewise, it will be appreciated that Monte Carlo analysis may likewise be applied to electronic deposit information as well as a combination of electronic and non-electronic deposit information without departing from example embodiments of the invention. Moreover, it will be appreciated that other types of analysis methods, including regressions and genetic algorithms, may likewise be utilized instead of or in combination with the template matching or Monte Carlo Analysis described herein.

A. Template Matching

Figure 2:
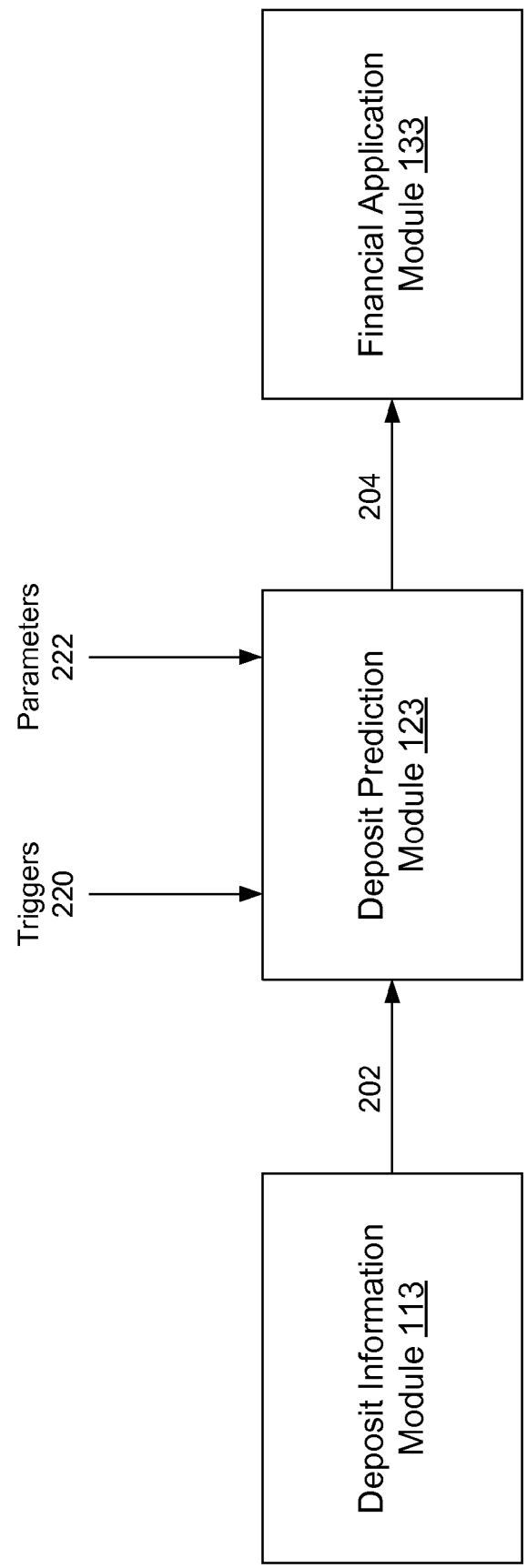
FIG. 2 illustrates a block diagram of an example deposit prediction process based upon template matching, according to an example embodiment of the invention.

FIG. 2 illustrates a block diagram of an example deposit prediction process based upon template matching, according to an example embodiment of the invention. The operation of the block diagram of FIG. 2 will be discussed in conjunction with the flow diagram of FIG. 3.

Turning now to block 302, a deposit information module 113 may access or receive deposit information of at least one customer, including demand deposit account (DDA) information for the at least one customer. According to an example embodiment of the invention, the deposit information may be accessed or received from database 119 or memory 112. In block 304, the deposit information module 113 may filter or otherwise process the received deposit information to obtain electronic deposit information of the at least one customer. Likewise, the deposit information module 113 may filter the deposit information to obtain electronic deposit information that falls within one or more date parameters—for example, based upon one or more date ranges (e.g., within the last 3 months, 6 months, 12 months, or between 2 dates) or statement periods.

In block 306, the deposit information module 113 associated with financial institution computer 110 or another computer may deliver the electronic deposit information 202 for one or more accounts of at least one customer to the deposit prediction module 123 of service provider computer 120 or another computer. Where the deposit information module 113 and deposit prediction module deposit prediction module 123 are provided for in the same computer, the delivery of the electronic deposit information 202 may be an internal delivery. Otherwise, the delivery of the electronic deposit information 202 may be delivered to the deposit prediction module 123 via a network such as network 140. In an example embodiment of the invention, the deposit information 202 may be provided in a file format (e.g., CSV file, tab separated file, etc.), a database format, or any other format.

Table I illustrates example deposit information 202 for an account of an example customer that may be delivered from the deposit information module 113 to the deposit prediction module 123. As shown in Table I, the deposit information 202 may include a Date field, an Amount field, and a Count field. Where two or more electronic deposits are received for an account on the same Date, the Count field may indicate the number of electronic deposits that have been aggregated in the Amount. For example, in Table I, the example electronic deposit on 08-29-YYYY includes 2 counts covering two separate deposits on the same day that amount to $1600.00.

TABLE I

| Date | Amount | Count |
|------|--------|-------|
| 08-01-YYYY | $ 500.00 | 1 |
| 08-08-YYYY | $ 600.00 | 1 |
| 08-15-YYYY | $ 700.00 | 1 |
| 08-22-YYYY | $ 600.00 | 1 |
| 08-29-YYYY | $1600.00 | 2 |
| 09-05-YYYY | $ 600.00 | 1 |
| 09-12-YYYY | $ 700.00 | 1 |
| 09-19-YYYY | $ 500.00 | 1 |
| 09-26-YYYY | $1500.00 | 2 |

According to an example embodiment of the invention, the deposit information 202 may exclude the payor name or other identification associated with the payor for each deposit in the deposit information 202. As an example, the deposit information 202 may exclude the payor name in order to protect the privacy of its customers or to otherwise simplify the amount or type of deposit information delivered to the deposit prediction module 123. However, it will be appreciated that in other example embodiments of the invention, the payor name or identification may be available as well.

In block 308, the deposit prediction module 123 may utilize template matching to identify one or more deposit patterns in predicting a next deposit date and/or amount, according to an example embodiment of the invention. In general, template matching may involve determining which template pattern, or combination of template patterns, best characterizes (e.g., a best fit) or explains the received deposit information 202. According to an example embodiment of the invention, each template pattern may define a respective time or date interval between expected deposits.

Figure 4A:
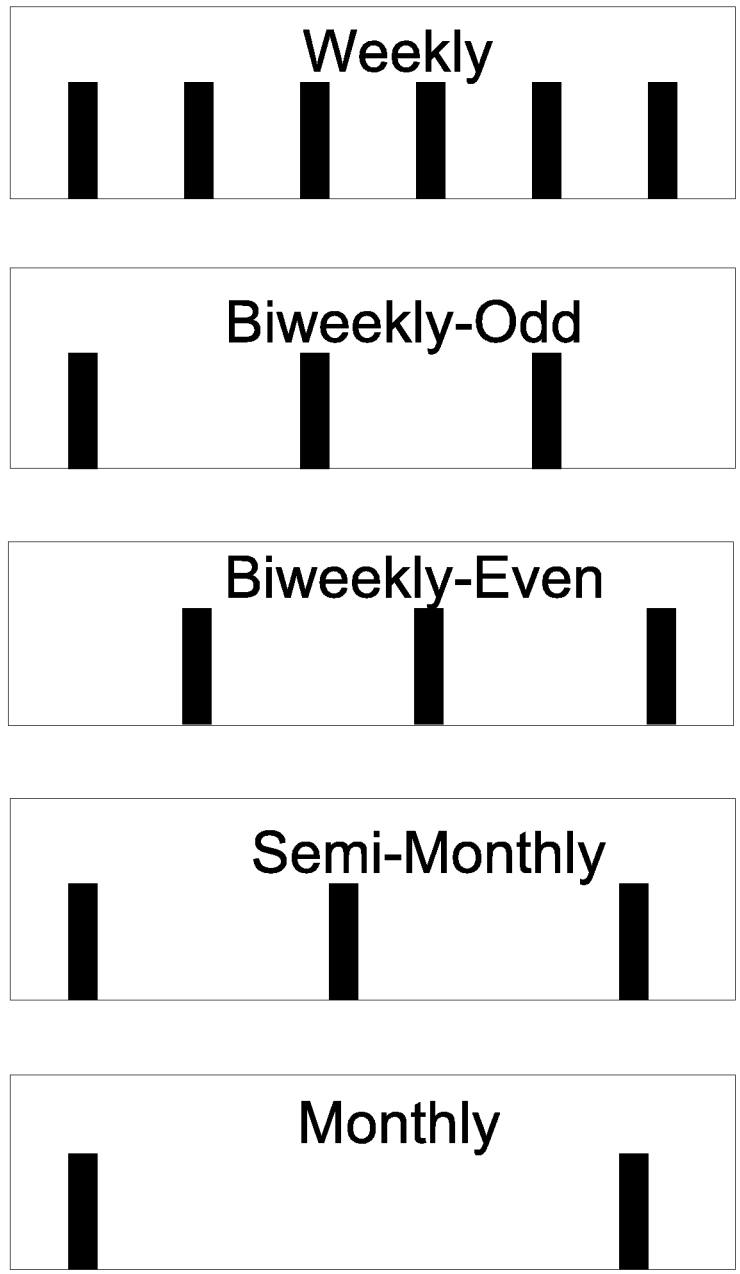
FIGS. 4A and 4B illustrate example template patterns, according to an example embodiment of the invention.
Figure 4B:
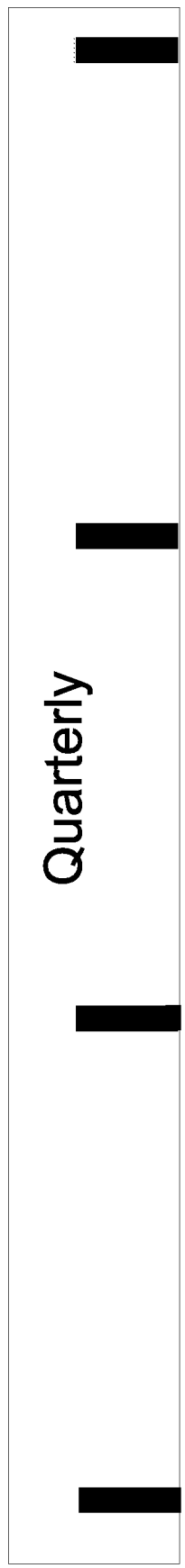

FIGS. 4A and 4B illustrate example template patterns that may be utilized by the deposit prediction module 123, according to an example embodiment of the invention. As shown in FIGS. 4A and 4B, the template patterns may include weekly, biweekly (odd or even), semi-monthly, monthly, or quarterly template patterns. It will be appreciated that each of the template patterns shown in FIGS. 4A and 4B are illustrative of one of a family of template patterns. For example, there may be a family of weekly template patterns, each starting on a respective day of the week. It will be appreciated that other template patterns, including semi-annual and annual template patterns, and variations thereof may also be available without departing from example embodiments of the invention.

Still referring to block 308, the deposit prediction module 123 may perform template matching in accordance with one or more triggers 220 and/or one or more parameters 222. The one or more triggers 220 may be operative to determine when the deposit prediction module 123 initiates, directs, or performs the template matching. The one or more parameters 222 may determine how the template matching operates. The one or more triggers 220 and parameters 222 may be set or specified by a service provider, financial institution, financial services company, or another similar entity.

The triggers 220 may determine when or a frequency that the deposit prediction module 123 performs the template matching. For example, a trigger 220 may be based upon an event such as the receipt of the deposit information 202 from the deposit information module 113 of the financial institution computer 110. Another trigger 220 may be a specific request received from a financial institution, service provider, financial service company, or other similar entity. Yet another trigger 220 may specify that the deposit prediction module 123 performs template matching on a periodic basis, perhaps nightly on weekday nights, according to an example embodiment of the invention. Other variations of triggers 220 are available in accordance with example embodiments of the invention.

The parameters 222 may determine how template matching is performed by the deposit prediction module 123. Examples of the parameters 222 may include:

Maximum_Tolerance_Days: A maximum allowed distance or interval (e.g., calendar days or business days) between a scheduled deposit date (or adjusted deposit date) in a template pattern and an actual deposit date. Each type of template pattern (e.g. weekly, biweekly, etc.) can have its own value of Maximum Tolerance_Days.

Minimum_Number_Deposit_Days_Covered: A minimum number of scheduled deposit dates (or adjusted deposit dates) that must correspond to an actual deposit date for the set of those dates to be considered as matching a template pattern. Each type of template pattern (e.g. weekly, biweekly, etc.) can have its own value of Minimum_Number_Deposit_Days_Covered.

Minimum_Percent_Deposit_Days_Covered: The minimum percent of scheduled deposit dates (or adjusted deposit dates) that must cover an actual deposit date for the set of those dates to be considered as matching a template pattern. Each type of template pattern (e.g. weekly, biweekly, etc.) can have its own value of Minimum_Percent_Deposit_Days_Covered.

Allow_Missed_Last_Deposit?: Whether or not a pattern can end with a missed deposit and still be regarded as matching a template pattern.

Expandable_Tolerance_Pattern_Types: List of those pattern types where Maximum_Tolerance_Days may be increased by one in a second run of the pattern detection algorithm.

Interruption_Types: One of (Not_Interrupted, Properly_Interrupted, Badly_Interrupted). Based on a pattern's interruption type, an attempt may be made to split it into two or more template patterns of other types.

RMS_Split_Multiplier: RMS (Root Mean Square) error provides a rough estimate for the goodness of fit between a template pattern and the underlying raw data it is presumed to cover. When the coverage of a set of more coarse-grained patterns improves the coverage of a single more fine-grained pattern by RMS_Split_Multiplier, a split is attempted.

Minimum_History_Length: The minimal number of deposits the deposit information of an account must have on a given channel to be considered for template matching. (Channels={Electronic (e.g., ACH), Non-electronic (e.g., paper)}).

Once the deposit prediction module 123 has identified (or not identified) one or more deposit patterns in block 304, then processing may proceed to block 310. In block 310, the deposit prediction module 123 may generate deposit prediction information 204. The generated deposit prediction information 204 may identify or otherwise indicate which template pattern(s) were matched. The deposit prediction information 204 may also include information regarding one or more dates and/or amounts regarding predicted future deposits. Alternatively, if no matching template patterns were identified in block 306, then the deposit prediction information 204 may indicate that no matching template patterns were identified based upon the deposit information 202 of the customer.

In block 312, the generated deposit prediction information 204 may be delivered from the deposit prediction module 123 of the service provider computer 120 or another computer to the financial application module 133 of the financial services computer 130 or another computer. Where the deposit prediction module 123 and the financial application module 133 are provided for in the same computer, the delivery of the deposit prediction information 204 may be an internal delivery. Otherwise, the delivery of the deposit prediction information 204 may be delivered to the financial application module 133 via a network such as network 140. The financial application module 133 may set/determine parameters for or otherwise provide, initiate, direct, or offer one or more services based upon the deposit prediction information 204. According to an example embodiment of the invention, the services may include or be associated with one or more of:

Determining when to re-present returned deposit item (e.g., checks) to a financial institution.

Determining capacity to repay;

Setting an account overdraft limit;

Determining loan or line of credit eligibility;

Determining loan or line of credit amount;

Setting customized disclosure terms for loans or lines of credit (e.g., payment due dates for loans or lines of credit);

Determining when to step down or shut down loans or lines of credit;

Optimizing collection effort timing: When best, relative to an upcoming or just received deposit, to contact a customer and pursue various types of collection efforts;

Determining likelihood of charge-off of a loan or line of credit;

A likelihood of chargeoff may be determined based upon whether there are one or more matching template patterns, A likelihood of chargeoff may be determined based upon the length of the periodicity patterns of the one or more template patterns, or A likelihood of chargeoff may be determined base upon a template pattern interruption;

Setting loan repayment terms on past-due accounts.

Figure 3:
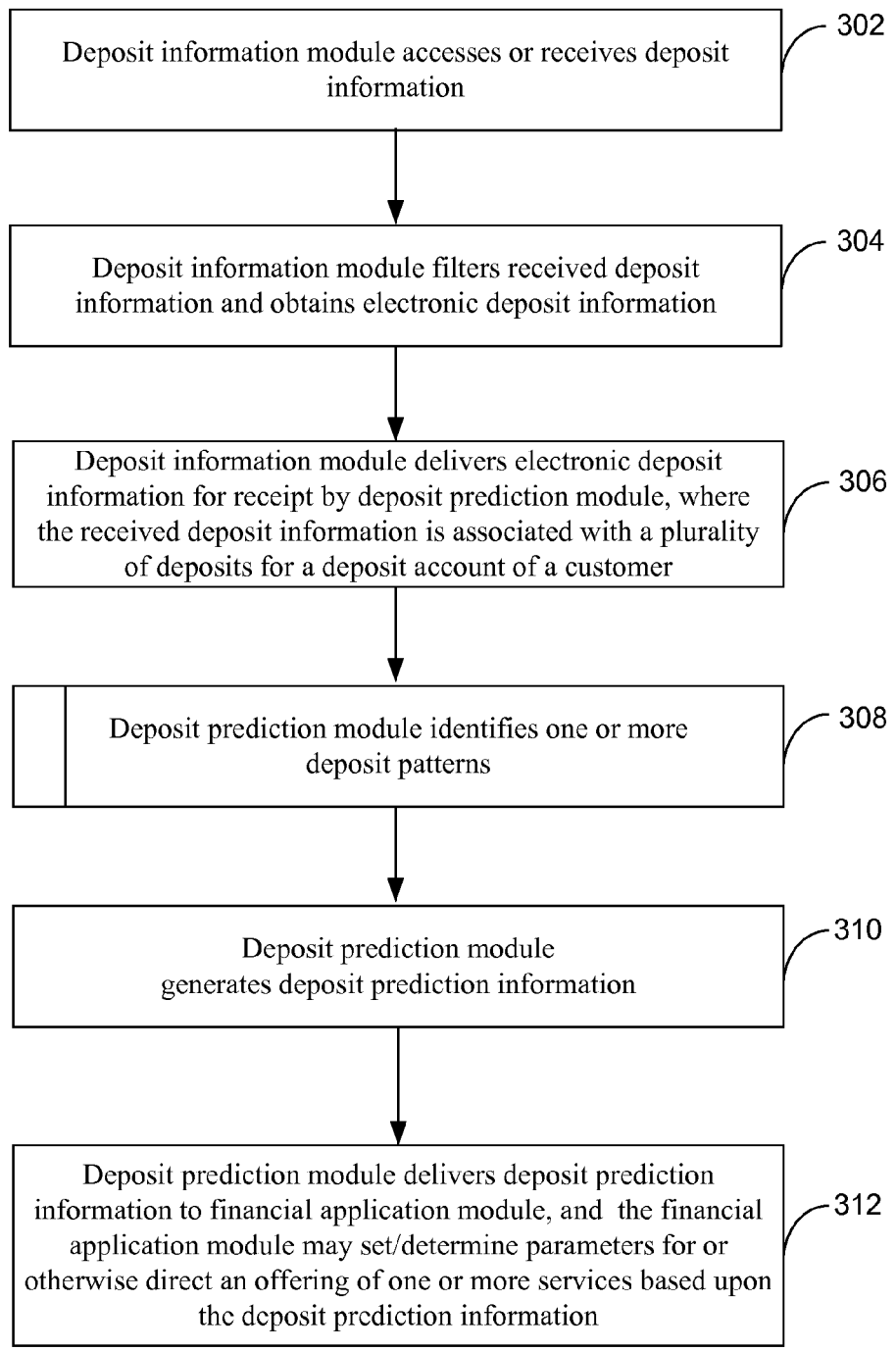
FIG. 3 illustrates a flow diagram of an example deposit prediction process based upon template matching, according to an example embodiment of the invention.

Many variations of FIG. 3 are available in accordance with example embodiments of the invention. According to one example variation, block 308 may also identify an interruption of an expected deposit. For example, a deposit prediction module may have analyzed prior deposit information and previously predicted one or more dates and amounts for one or more future deposits. Accordingly, one or more deposits may be expected on the predicted date(s). The deposit prediction module can then determine, based upon updated deposit information, whether any actual deposits corresponding to the expected deposits were actually received. If an actual deposit was not received by the expected date, or if the amount of the actual deposit differs (e.g., differs by a certain amount) from the expected amount, the generated deposit prediction information may indicate an interruption in a deposit pattern. The interruption in the deposit pattern may be utilized to determine whether to provide a loan, whether to allow an overdraft, or how to handle collections of an overdue payment. Other application of this deposit prediction information may be available in accordance with example embodiments of the invention.

An example process for identifying one or more deposit patterns according to block 308 of FIG. 3 will now be described with respect to the example flow diagram of FIG. 5. It will be appreciated that the flow diagram of FIG. 5 is provided by way of example only, and that many variations of FIG. 5 are available in accordance with other example embodiments of the invention.

Figure 5:
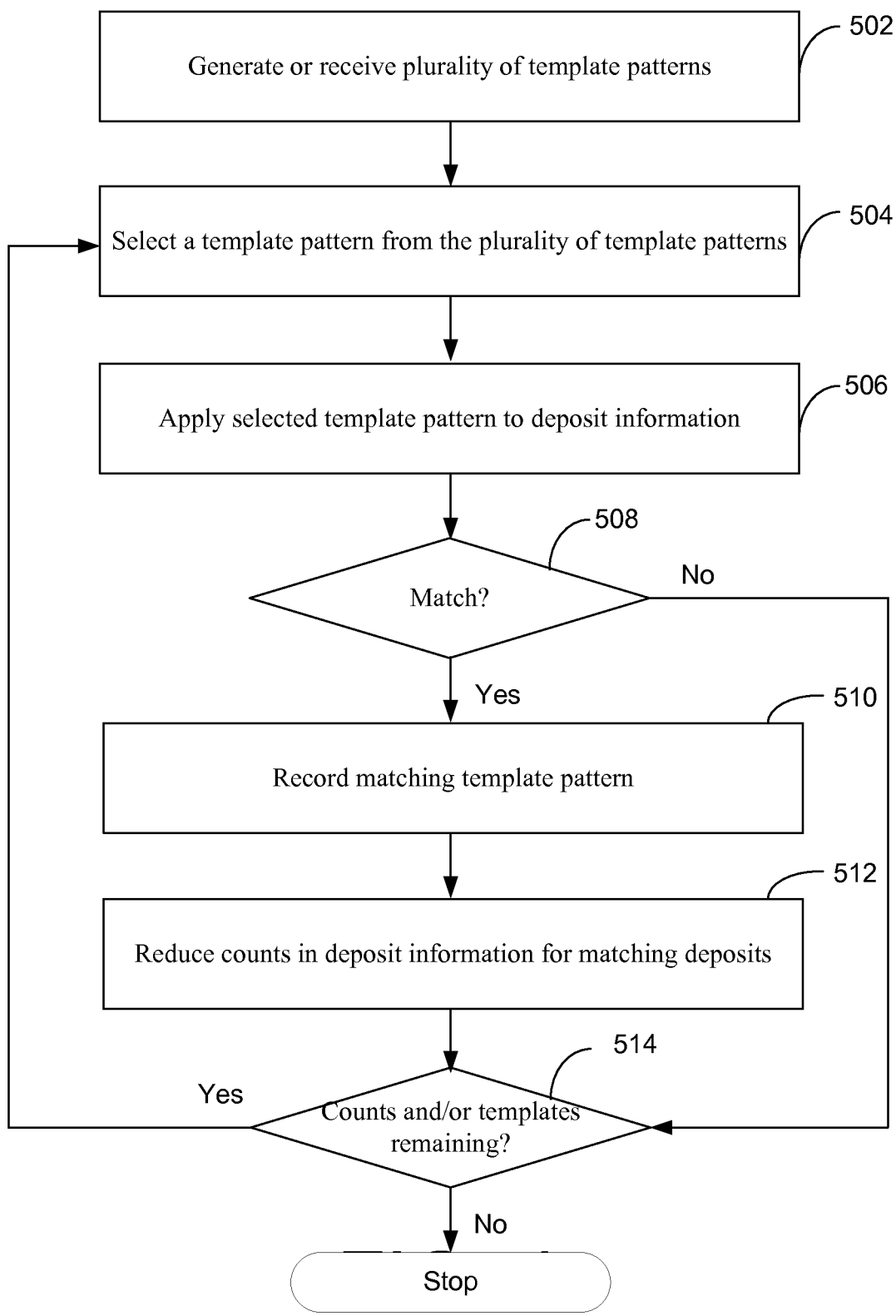
FIG. 5 illustrates an example process for identifying one or more deposit patterns, according to an example embodiment of the invention.

In block 502o FIG. 5, a plurality of template patterns may be generated, retrieved, or otherwise received by the deposit prediction module 123. As an example, the template patterns may include weekly template patterns, bi-weekly template patterns, semi-monthly template patterns, quarterly template patterns, and the like. Further, the template patterns may start on given days of the week, days of the month, or certain number of days from the end of a month or another day during the month. For example, the weekly template patterns may include 5 respective template patterns, where each respective weekly template pattern starts on a respective day from Monday-Friday. Other weekly template patterns may include a Saturday weekly template pattern and a Sunday weekly template pattern. Similarly, the other template patterns, including the bi-weekly template patterns, semi-monthly template patterns, and quarterly template patterns may each comprise one or more template patterns having different start days (e.g., on a different day of a week, month, etc.). Still referring to block 502, the deposit prediction module 123 may adjust the template patterns based upon known weekend and/or holidays. As an example, an expected date of deposit in a template pattern that falls on a weekend or holiday may be moved either forward or backward to a valid processing day.

In block 504, a template pattern from the plurality of template patterns is selected by the deposit prediction module 123. In an example embodiment of the invention, the deposit prediction module 123 may prioritize the plurality of templates from most-frequent intervals (e.g., weekly template patterns) to least-frequent intervals (e.g., monthly template patterns). However, other prioritizations may be utilized for the plurality of template patterns as well, including from least-frequent intervals to most-frequent intervals. The deposit prediction module 123 may select one of the template patterns, perhaps a template pattern with the most frequent intervals (e.g., weekly template pattern).

Figure 6A:
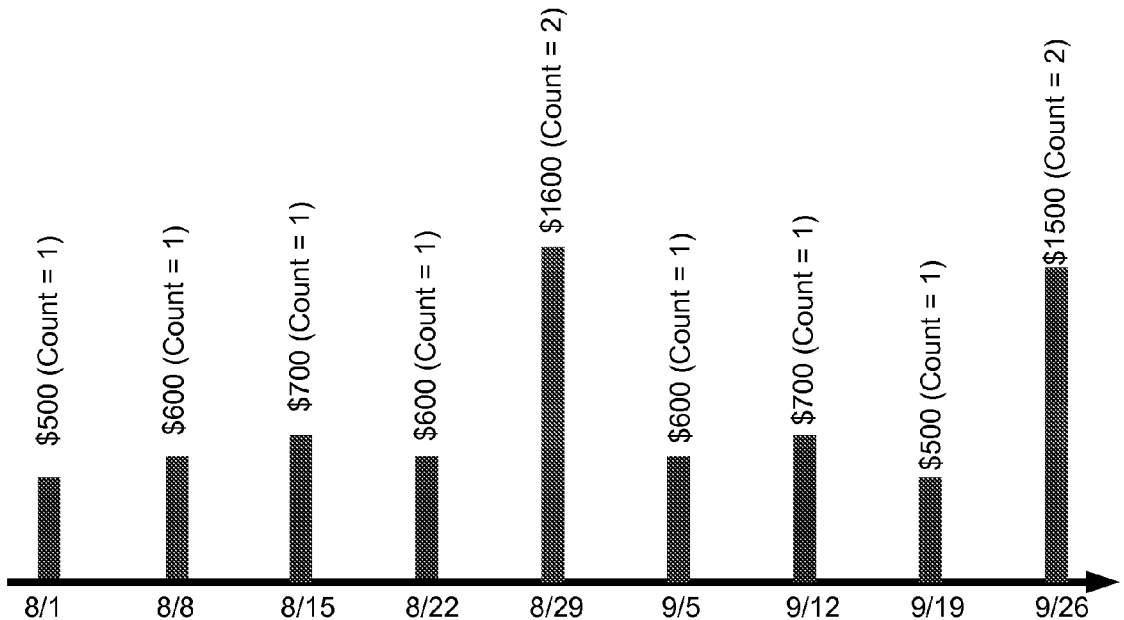
FIG. 6A illustrates example representations of electronic deposit information, according to an example embodiment of the invention.

In block 506, the deposit prediction module 123 may apply the selected template pattern to the deposit information, which may include electronic deposit information comprising deposit dates and respective counts/amounts. Example representations of electronic deposit information are shown in Table I above and in the diagram of FIG. 6A.

In block 508, the deposit prediction module 123 may determine whether the selected template pattern matches at least a portion of the deposit information. In particular, the deposit prediction module 123 may utilize one or more parameters 222 to determine whether there is a match with the selected template pattern. As an example, a parameter 222 such as Maximum_Tolerance_Days may indicate a maximum allowed distance or interval between a scheduled/adjusted deposit date according to the template pattern and an actual deposit date according to the deposit information. Another parameter 222 such as Minimum_Number_Deposit_Days_Covered may indicate a minimum number of scheduled deposit dates (or adjusted deposit dates) that must cover an actual deposit date for the set of those dates to be considered a pattern that matches the selected template pattern. Similarly, a parameter 222 such as Allow_Missed_Last_Deposit? may indicate whether a pattern can end with a missed deposit and still be regarded as matching the selected template pattern. It will be appreciated that other parameters 222 may likewise be utilized by the deposit prediction module 123 without departing from example embodiments of the invention.

If block 508 determines that the selected template pattern matches at least a portion of the deposit information, then processing may proceed to block 510. In block 510, the deposit prediction module 123 may record or otherwise store at least an identification of the matching template pattern. In addition, the deposit prediction module 123 may also store information about non-ambiguous deposits. For example, referring to FIG. 6A, a selected weekly pattern may match non-ambiguously to deposits on the following dates where there is only a single count: 8/1, 8/8, 8/15, 8/22, 9/5, 9/12, 9/19, 9/26. Based upon the non-ambiguous deposits, the deposit prediction module 123 may perform one or more calculations, including determining an average or mean amount of the non-ambiguous deposits, which may be stored or recorded in conjunction with the identified matching template pattern.

Figure 6B:
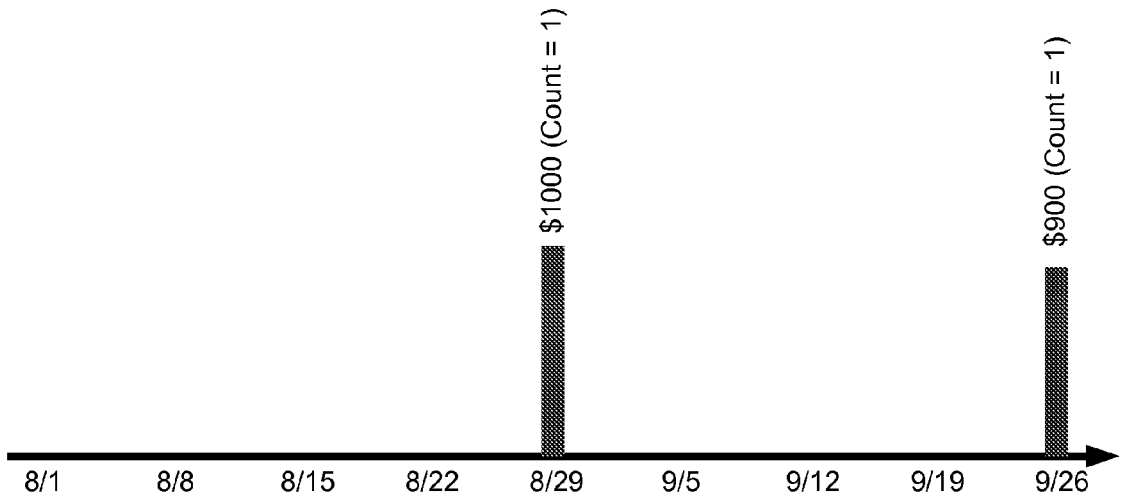
FIG. 6B illustrates example representations of count reductions as applied to the electronic deposit information of FIG. 6A, according to an example embodiment of the invention.

Following block 510, processing may proceed to block 512. In block 512, the deposit prediction module 123 may reduce the counts in the deposit information for deposits that match the selected template pattern. In particular, non-ambiguous deposits having only a single count may be eliminated from the deposit information. With respect to ambiguous deposits where the respective counts are greater than 1, the respective counts in the deposit information may be reduced by 1. Further, the aggregate amount associated with each ambiguous deposit in the deposit information may be reduced by an amount that may be determined based upon an average, mean, median, or mode amount of the non-ambiguous deposits. For example, in FIG. 6A, the mean amount of the non-ambiguous deposits (8/1, 8/8, 8/15, 8/22, 9/5, 9/12, 9/19, 9/26) is $600. Accordingly, in FIG. 6B, the aggregate amount of each ambiguous deposit in the deposit information has been reduced by the mean amount of $600 determined for the non-ambiguous deposits. Likewise, as shown in FIG. 6B, the counts for the ambiguous deposits on 8/29 and 9/26 in FIG. 6A have been reduced from 2 to 1.

Block 514 is reached following block 512 or if there is no match in block 508. Block 514 may determine whether the deposit information, as modified according to any matching template patterns, includes any remaining deposits that have not been accounted for. For example, FIG. 6B illustrates remaining counts on 8/29 and 9/26 that represent deposits that have not been accounted for. If block 514 determines that there are any remaining deposits that have not been accounted for, then processing may return to block 504 in which a next template pattern is selected. The deposit prediction module 123 may then repeat the process until all deposits have been accounted for, or until all templates have been attempted without accounting for all of the deposits.

It will be appreciated that the process of FIG. 5 may be performed a number of instances by the deposit prediction module 123 in order to determine a plurality of candidate sets of matching templates, according to an example embodiment. For example, by utilizing the process of FIG. 5 multiple times, the deposit prediction module 123 may determine a possible first candidate set using a weekly template pattern and a possible second candidate set using a combination of a biweekly (odd) template pattern and a bi-weekly (even) template pattern. The deposit prediction module 123 may then calculate an error (e.g., a standard error, root mean square error, etc.) for each candidate set to select the candidate set that minimizes the error.

B. Monte Carlo Analysis

Figure 7:
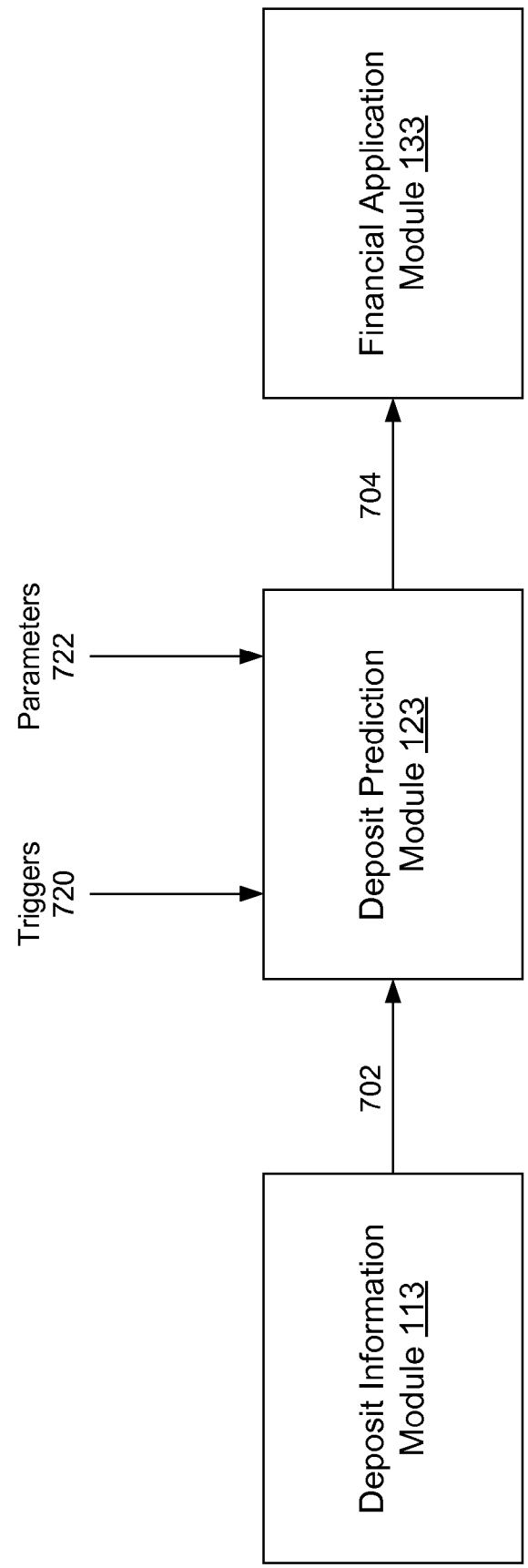
FIG. 7 illustrates a block diagram of an example deposit prediction process based upon Monte Carlo analysis, according to an example embodiment of the invention.

FIG. 7 illustrates a block diagram of an example deposit prediction process based upon Monte Carlo analysis, according to an example embodiment of the invention. The operation of the block diagram of FIG. 7 will be discussed in conjunction with the flow diagram of FIG. 8.

Figure 8:
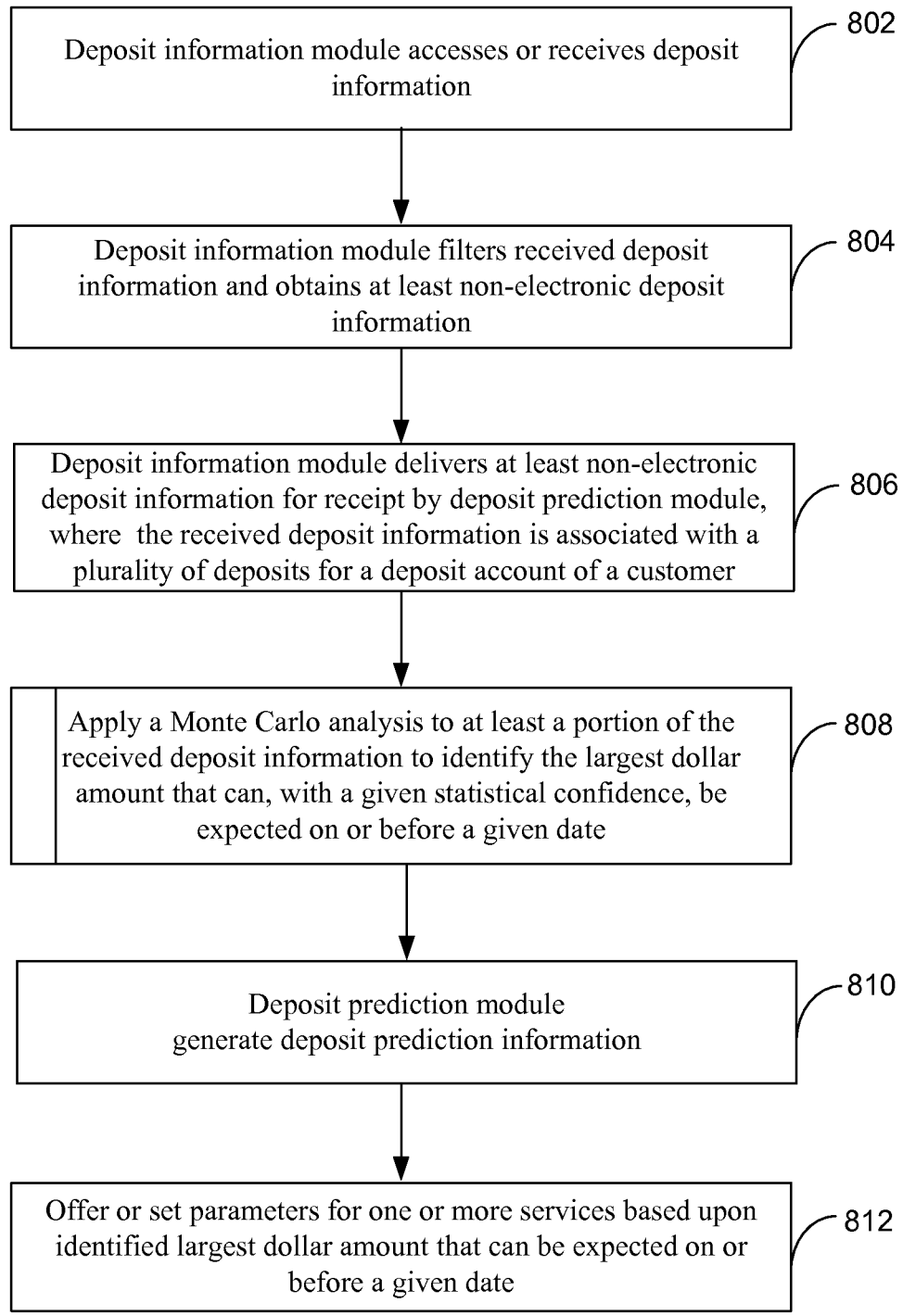
FIG. 8 illustrates a flow diagram of an example deposit prediction process based upon Monte Carlo analysis, according to an example embodiment of the invention.

Turning now to block 802 of FIG. 8, a deposit information module 113 may access or receive deposit information for at least one customer, including demand deposit account (DDA) information for the at least one customer. According to an example embodiment of the invention, the deposit information may be accessed or received from database 119 or memory 112. In block 804, the deposit information module 113 may filter or otherwise process the received deposit information to obtain at least non-electronic deposit information for the at least one customer. As described herein, non-electronic deposits may include ATM or teller-initiated deposits in the form of paper instruments such as checks or currencies such as cash. Likewise, the deposit information module 113 may filter the deposit information to obtain non-electronic deposit information that falls within one or more date parameters-for example, based upon one or more date ranges (e.g., within the last 3 months, 6 months, 12 months, or between 2 dates) or statement periods.

In block 806, the deposit information module 113 associated with financial institution computer 110 or another computer may deliver at least the non-electronic deposit information 702 for at least one customer to the deposit prediction module 123 of service provider computer 120 or another computer. Where the deposit information module 113 and deposit prediction module deposit prediction module 123 are provided for in the same computer, the delivery of the non-electronic deposit information 702 may be an internal delivery. Otherwise, the delivery of the non-electronic deposit information 702 may be delivered to the deposit prediction module 123 via a network such as network 140. In an example embodiment of the invention, the deposit information 702 may be provided in a file format (e.g., CSV file, tab separated file, etc.), a database format, or any other format.

Table II illustrates example non-electronic deposit information 702 for an example customer that may be delivered from the deposit information module 113 to the deposit prediction module 123. As shown in Table II, the deposit information 702 may include a Date field, an Amount field, and a Count field.

TABLE II

| Date | Amount |
|---|---|
| 01-22-YYYY | $ 800.00 |
| 02-12-YYYY | $ 100.00 |
| 03-11-YYYY | $ 100.00 |
| 03-25-YYYY | $1400.00 |
| 04-22-YYYY | $3200.00 |
| 05-13-YYYY | $ 100.00 |
| 06-24-YYYY | $1100.00 |

According to an example embodiment of the invention, the deposit information 702 may include an aggregate of all non-electronic deposits made on a particular date. For example, referring to Table II, the deposit on 03-25-YYYY may actually represent a plurality of checks that were deposited at a Teller or ATM. In addition, the deposit information 702 may exclude the payor name or other identification associated with the payor for each deposit in the deposit information 702. As an example, the deposit information 702 may exclude the payor name in order to protect the privacy of its customers or to otherwise simplify the amount or type of deposit information delivered to the deposit prediction module 123. However, it will be appreciated that in other example embodiments of the invention, the payor name or identification may be available as well.

In block 808, the deposit prediction module 123 may utilize Monte Carlo analysis to identify the largest expected total dollar or monetary amount that can, with a given statistical confidence, be expected to be deposited within a given interval or date range, according to an example embodiment of the invention. It will be appreciated that the largest expected total dollar or monetary amount does not preclude actual total dollar or monetary amounts that exceed the largest expected total dollar or monetary amount. In general, Monte Carlo analysis may use historical distributions in gaps between deposits and amounts to determine probabilities with which future deposits are likely to occur.

Still referring to block 808, the deposit prediction module 123 may perform the Monte Carlo analysis in accordance with one or more triggers 720 and/or one or more parameters 722. The one or more triggers 720 may be operative to determine when the deposit prediction module 123 initiates, directs, or performs the Monte Carlo analysis. The one or more parameters 722 may determine how the Monte Carlo analysis operates. The one or more triggers 720 and parameters 722 may be set or specified by a service provider, financial institution, financial services company, or another similar entity.

The triggers 720 may determine when or a frequency with which the deposit prediction module 123 performs the Monte Carlo analysis. For example, a trigger 720 may be based upon an event such as the receipt of the deposit information 702 from the deposit information module 113 of the financial institution computer 110. Another trigger 720 may be a specific request received from a financial institution, service provider, financial service company, or other similar entity. Yet another trigger 720 may specify that the deposit prediction module 123 performs the Monte Carlo analysis on a periodic basis, perhaps nightly on weekday nights, according to an example embodiment of the invention. Other variations of triggers 720 are available in accordance with example embodiments of the invention.

The parameters 722 may determine how Monte Carlo analysis is performed by the deposit prediction module 123. Examples of the parameters 722 may include:

Max_Number_Iterations: A maximum number of iterations of the Monte Carlo analysis to run for a given account. In an example embodiment of the invention, the Max_Number_Iterations can be used to halt the Monte Carlo analysis if convergence does not occur by the Max_Number_Iterations.

Simulation_Period: The duration (e.g., in days) of the period for which deposits are being simulated. It will be appreciated that too long a period may result in highly speculative results or excessive computer processing.

Confidence_Level: The desired statistical confidence level to be utilized with the deposit prediction in accordance with the Monte Carlo analysis. An example Confidence_Level may be 90% or 0.90.

Outlier_Multiplier: When the largest deposit amount is Outlier_Tolerance times as big as the next largest amount, it may be filtered out as an outlier.

Max_Allowed_Gap: Any series of deposits preceding a gap in days greater than or equal to Max_Allowed_Gap may be filtered out of the data.

Min_Weekly_Amount: Accounts having respective deposit information (i.e., case histories) in which the average weekly deposit is less than Min_Weekly_Amount may be dropped from consideration by the Monte Carlo analysis.

Min_Total_Amount: Accounts having respective deposit information where the total deposit amount is less than Min_Total_Amount may be dropped from consideration by the Monte Carlo analysis.

Min_Case_History_Length: Accounts have respective deposit information for a time period (e.g., in days) less than Min_Case_History_Length may be dropped from consideration by the Monte Carlo analysis.

Min_Deposits_Per_Month: Accounts having respective deposit information that average fewer than Min_Deposits_Per_Month may be dropped from consideration by the Monte Carlo analysis.

Max_Deposits_Per_Month: Accounts having respective deposit information that average greater than Max_Deposits_Per_Month may be dropped from consideration by the Monte Carlo analysis.

Filter_Sequence: An ordering in which the filtering and/or dropping criteria are evaluated or applied. It will be appreciated that depending on the order in which the parameters are evaluated, different accounts might survive or be dropped for consideration, and a surviving account might have deposit information containing a different set of deposits.

Once the deposit prediction module 123 has identified (or not identified) the largest expected total dollar or monetary amount that can, with a given statistical confidence, be expected to be deposited within a given interval or date range, then processing may proceed to block 810. In block 810, the deposit prediction module 123 may generate deposit prediction information 704. The generated deposit prediction information 704 may identify or otherwise indicate the determined largest dollar or monetary amount, the date by which the largest dollar or monetary amount can be expected, and any statistical confidence levels that the foregoing may be subject to. Alternatively, the deposit prediction information 704 may indicate that the Monte Carlo analysis could not make a determination of the largest expected total dollar or monetary amount that can, with a given statistical confidence, be expected to be deposited within a given interval or date range.

In block 812, the generated deposit prediction information 704 may be delivered from the deposit prediction module 123 of the service provider computer 120 or another computer to the financial application module 133 of the financial services computer 130 or another computer. Where the deposit prediction module 123 and the financial application module 133 are provided for in the same computer, the delivery of the deposit prediction information 704 may be an internal delivery. Otherwise, the delivery of the deposit prediction information 704 may be delivered to the financial application module 133 via a network such as network 140. The financial application module 133 may set/determine parameters for or otherwise provide, initiate, direct, or offer one or more services based upon the deposit prediction information 704. According to an example embodiment of the invention, the services may include or be associated with one or more of:

Determining when to re-present returned deposit item (e.g., checks) to a financial institution.
Determining capacity to repay;
Setting an account overdraft limit;
Determining loan or line of credit eligibility;
Determining loan or line of credit amount;
Setting customized disclosure terms for loans or lines of credit (e.g., payment due dates for loans or lines of credit);
Determining when to step down or shut down loans or lines of credit;
Optimizing collection effort timing: When best, relative to an upcoming or just received deposit, to contact a customer and pursue various types of collection efforts;
Determining likelihood of charge-off of a loan or line of credit;
Setting loan repayment terms on past-due accounts.

Figure 9:
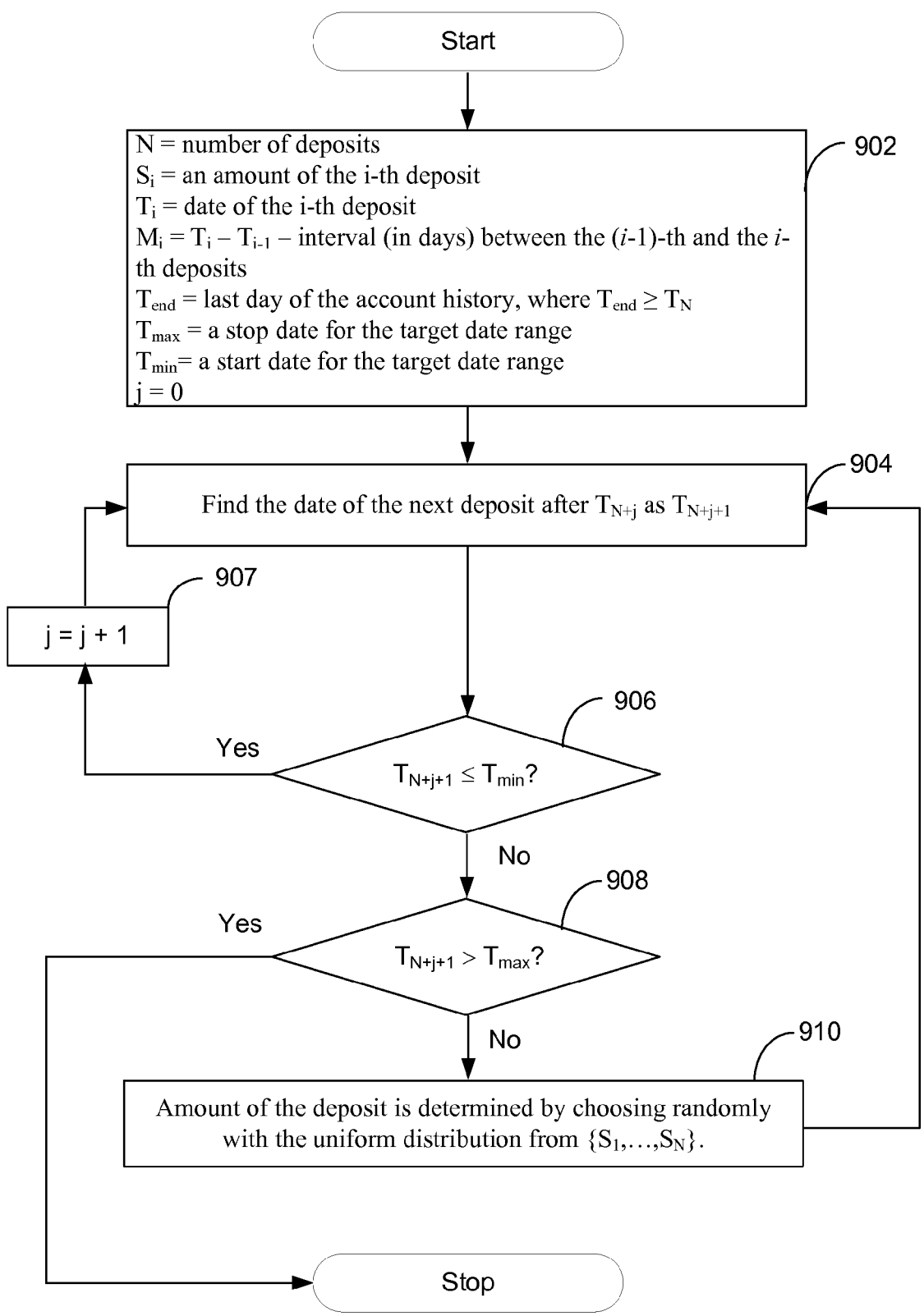
FIG. 9 illustrates a flow diagram for an example Monte Carlo analysis, according to an example embodiment of the invention.

An example process for an example Monte Carlo analysis according to block 808 of FIG. 8 will now be described with respect to the example flow diagram of FIG. 9. It will be appreciated that the flow diagram of FIG. 9 is provided by way of example only, and that many variations of FIG. 9 are available in accordance with other example embodiments of the invention. It will be also appreciated that the process illustrated in FIG. 9 is only for a single iteration of the Monte Carlo analysis, and that many iterations may be necessary to determine the largest expected total dollar or monetary amount that can, with a given statistical confidence, be expected to be deposited within a given interval or date range. For example, the Monte Carlo analysis may be used to answer the question: "What is the largest total amount we expect to be deposited to the account during period ($T_{min}$, $T_{max}$) with a particular confidence level (e.g., perhaps set by the parameter Confidence_Level (e.g., 0.90))?"

In block 902 of FIG. 9, the deposit prediction module 123 may set or initialize a plurality of variables. For example, the deposit prediction module 123 may set or initialize the following variables:

N=a number of deposits,
$S_i$=an amount of the i-th deposit,
$T_i$=date of the i-th deposit,
$M_i = T_i - T_i - T_{i-1}$, which represents the interval (in days) between the (i−1)-th deposit and the i-th deposit, and
$T_{end}$=the last date of the account history, where $T_{end}$ is greater than or equal to $T_N$,
$T_{max}$=a stop date for the target date range,
$T_{min}$=a start date for the target date range,
j=0.

In block 904, the deposit prediction module 123 may find the date of the next deposit after date $T_N$. To do this, the deposit prediction module 123 may select a random number k uniformly distributed on {2, . . . , N}. The date of the next deposit may be designated as date $T_{N+j+1} = T_{N+j} + M_k$. In block 906, if date $T_{N+1}$ is less or equal to date $T_{min}$, then Counter j may be incremented in block 907, and date $T_{N+1}$ may be chosen again in block 904, according to an example embodiment of the invention.

Following block 906, processing may proceed to block 908. In block 908, the deposit prediction module 123 may determine whether $T_{N+j-1}$ is less than $T_{max}$ such that $T_{N+j+1}$ falls within the date range or period ($T_{min}$, $T_{max}$). If so, then processing may proceed to block 910. In block 910, an amount of deposit on $T_{N+j+1}$ may be determined by choosing randomly with the uniform distribution from {$S_1$, . . . , $S_N$}. The completion of block 910 may complete a first iteration of the Monte Carlo analysis.

For a particular iteration of the Monte Carlo analysis, blocks 904-910 may be repeated to obtain a distribution function of the expected largest amount deposited during the period or date range or period ($T_{min}$, $T_{max}$). For example, a second iteration may proceed to determine the date and amount of the (N+2)-th deposit. The process for the particular iteration may be terminated when the date of the current deposit becomes greater than the date $T_{max}$.

It will be appreciated that the Monte Carlo analysis may be repeated a number of iterations until a distribution function of the expected largest total amount deposited during the date range or period ($T_{min}$, $T_{max}$) is obtained within a desired confidence level. It will be appreciated that in some instances, there may be no convergence to an expected largest total amount deposited during the date range or period ($T_{min}$, $T_{max}$) for a desired confidence level.

Figure 10:
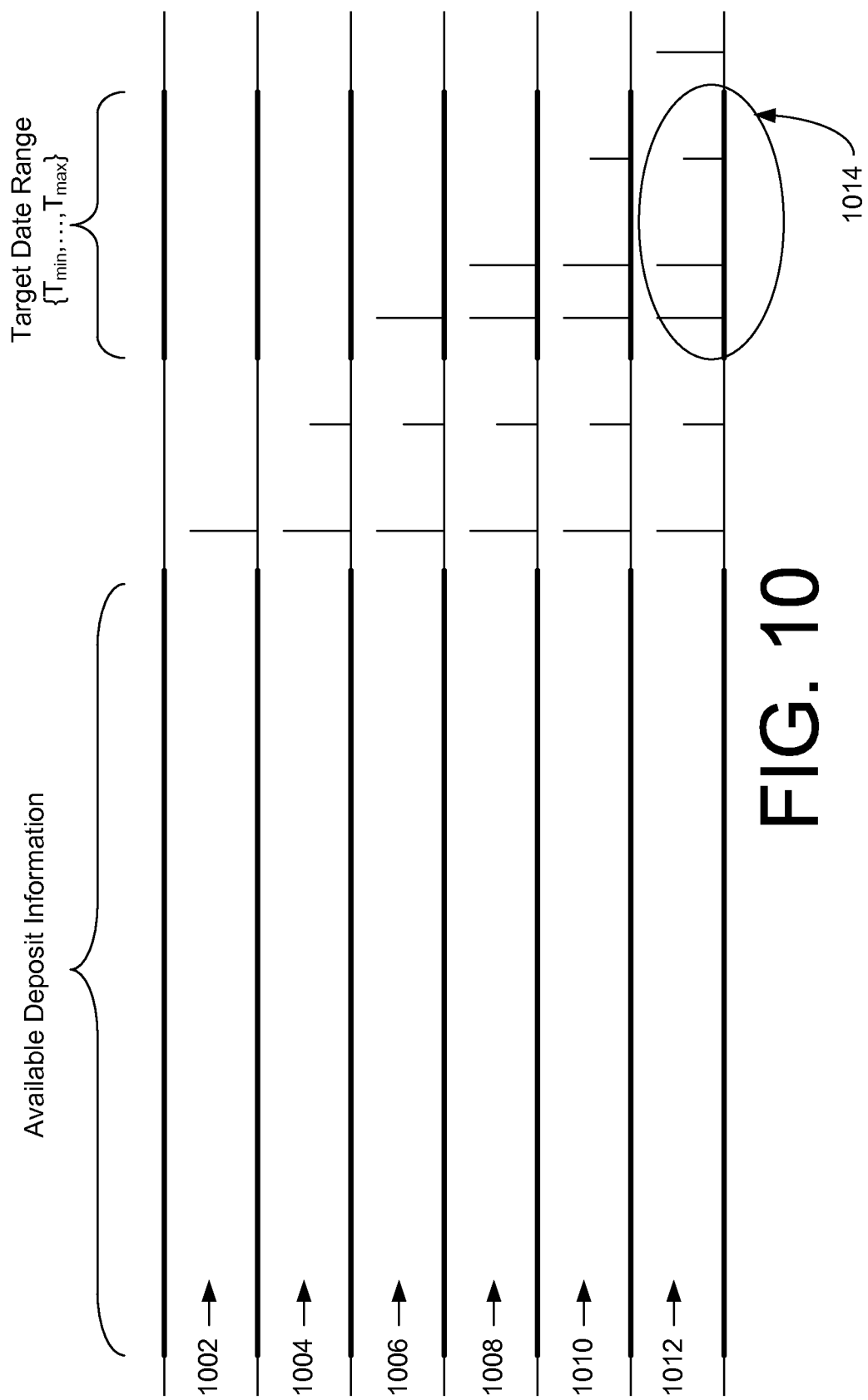
FIG. 10 illustrates a graphical representation illustrating a plurality of distributions of sums deposited during the target date range corresponding to a respective plurality of Monte Carlo iterations, according to an example embodiment of the invention.

FIG. 10 illustrates a graphical representation illustrating an example single Monte Carlo iteration according to an example embodiment of the invention. As shown by 1002, a random amount and interval may be chosen from the available deposit information, extending the deposit stream into the future, although not yet within target date range $\{T_{min}, \ldots, T_{max}\}$. In 1004, a second random amount and interval may be chosen from the available deposit information, extending the deposit stream further into the future, although again not yet within target date range $\{T_{min}, \ldots, T_{max}\}$. In 1006, the deposit stream eventually extends into the target date range $\{T_{min}, \ldots, T_{max}\}$. In 1008, the deposit stream extends further into the target date range $\{T_{min}, \ldots, T_{max}\}$. In 1010, the deposit stream extends yet further into the target date range $\{T_{min}, \ldots, T_{max}\}$. In 1012, the deposit stream finally extends beyond the target date range $\{T_{min}, \ldots, T_{max}\}$. A distribution 1014 of the amounts deposited during period ($T_{min}$, $T_{max}$) is then obtained, for a confidence level, according to an example embodiment of the invention.

Figure 11:
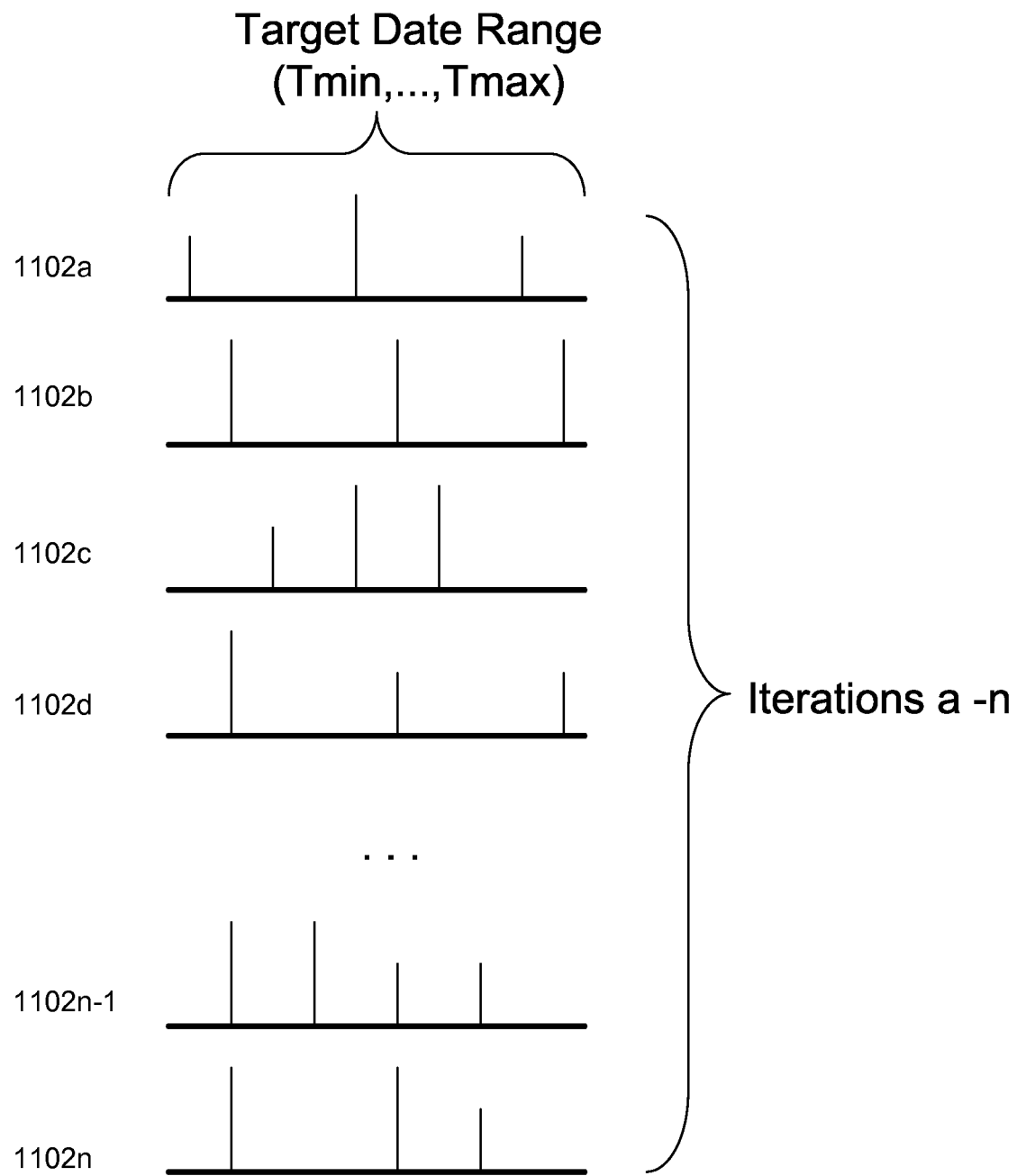
FIG. 11 illustrates a graphical representation of a plurality of deposited sums predicted by Monte Carlo analysis according to an example embodiment of the invention.

FIG. 11 illustrates a graphical representation illustrating a plurality of distributions 1102a-n of expected amounts deposited during the target date range corresponding to a respective plurality of Monte Carlo iterations a-n, according to an example embodiment of the invention. It will be appreciated that the number of Monte Carlo iterations that are performed may be a predetermined number. Alternatively, the Monte Carlo iterations can continue until statistical measures (e.g., standard error, standard deviation, etc.) indicate that the results (e.g., a distribution function based upon the aggregate of the distributions 1102a-n) accumulated so far as stable and unlikely to change with further iterations. Indeed, the Monte Carlo analysis may be repeated a number of iterations until the current distribution function results in the identification of in a largest monetary amount that can, within a given or predetermined confidence level, be expected on or before a given date. For example, each iteration of the Monte Carlo analysis may further refine a distribution function associated with a statistical measure such a standard error until the largest monetary amount is determined with a desired standard error.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

In certain embodiments, performing the specified functions, elements or steps can transform an article into another state or thing. For instance, example embodiments of the invention can provide certain systems and methods that transform deposit information representative of actual historical deposits into an account into a deposit prediction information representative of a next deposit and/or amount.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

Many modifications and other embodiments of the invention will come to mind to one skilled in the art to which this invention pertains and having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
  receiving, by a financial system comprising one or more computers, deposit information associated with a plurality of deposits for a deposit account of a financial institution customer, wherein the deposit information includes a plurality of deposit amounts, and a respective date associated with each of the plurality of deposit amounts;
  identifying, by the financial system, based upon the received deposit information, one or more deposit patterns for the deposit account of the financial institution customer by applying one or more predefined template patterns to the deposit information and determining that one or more of the applied predefined template patterns match at least a portion of the deposit information;

generating, by the financial system, an indication of the identified one or more deposit patterns; and providing or offering, by the financial system and based at least in part on the indication of the identified one or more deposit patterns, one or more services associated with the financial institution customer.

2. The method of claim 1, wherein the deposit information further specifies a respective count for each of the plurality of deposit amounts, wherein the respective count indicates a number of transactions received on the respective date, and wherein applying one or more predefined template patterns comprises:

determining that a first template pattern of the one or more applied predefined template patterns matches at least a portion of the deposit information;

modifying the deposit information by reducing the respective count for each deposit amount matched by the first template pattern; and determining that a second template pattern of the one or more applied predefined template patterns matches the at least a portion of the modified deposit information, wherein the prior steps are performed by one or more computers associated with a service provider.

3. The method of claim 1, wherein the deposit information includes electronic deposit information associated with a plurality of deposits that were deposited electronically.

4. The method of claim 1, wherein prior to applying one or more predefined template patterns, the one or more predefined template patterns are adjusted based upon one or both of weekend or holiday dates.

5. The method of claim 1, wherein the one or more predefined template patterns comprise one or more quarterly template patterns, monthly template patterns, semi-monthly template patterns, bi-weekly template patterns, or weekly template patterns.

6. The method of claim 5, wherein the one or more weekly template patterns comprise a plurality of weekly template patterns, wherein each of the weekly template patterns begins on a respective day of a week.

7. The method of claim 1, wherein the generated indication of the identified one or more deposit patterns includes one or more of the following: (i) an identification of the one or more deposit patterns, (ii) an amount of a future deposit, or (iii) a date or a date range of a future deposit.

8. The method of claim 7, wherein the generated indication that includes the date or the date range of the future deposit is compared to future deposit information to determine an interruption of at least one of the identified one or more deposit patterns.

9. The method of claim 1, wherein the one or more services are associated with at least one of: (i) approving a loan or a credit line for the financial institution customer; (ii) increasing or reducing an amount of the loan or the credit line for the financial institution customer, (iii) determining a due date or a payment schedule for the loan or the credit line for the financial institution customer; or (iv) determining when to contact the financial institution customer for collections or an offering.

10. The method of claim 1, wherein the one or more predefined template patterns are applied according to one or more parameters, wherein the parameters are associated with one or more of: (i) a maximum allowable interval between a scheduled deposit date in a particular one of the one or more predefined template pattern and an actual deposit date; or (ii) a minimum number of scheduled deposit dates in a particular one of the one or more predefined template pattern that must correspond to an actual deposit date in order for the particular one of the one or more predefined template pattern to be considered a matching predefined template pattern.

11. The method claim 1, wherein a predefined template pattern is determined to match based upon a predetermined number of expected deposits in the predefined template pattern corresponding to actual deposits in at least a portion of the deposit information.

12. The method of claim 1, wherein the one or more predefined template patterns comprise a plurality of predefined template patterns, wherein the plurality of predefined template patterns are prioritized according to a respective frequency interval associated with each of the plurality of predefined template patterns, wherein the prioritization is utilized in determining an order in which to apply the plurality of predefined template patterns to the deposit information.

13. The method of claim 1, wherein the deposit information is received from a financial institution computer, and wherein the generated indication of the identified one or more deposit patterns is provided to a financial services computer.

14. The method of claim 13, wherein the financial institution computer and the financial services computer are (i) associated with a same entity, or (ii) are a same computer.

15. A system, comprising:

at least one memory that stores computer-executable instructions; and at least one processor configured to access the at least one memory, wherein the at least one processor is further configured to execute the computer-executable instructions to:

receive deposit information associated with a plurality of deposits for a deposit account of a financial institution customer, wherein the deposit information includes a plurality of deposit amounts, and a respective date associated with each of the plurality of deposit amounts;

identify, based upon the received deposit information, one or more deposit patterns for the deposit account of the financial institution customer by applying one or more predefined template patterns to the deposit information and determining that one or more of the applied predefined template patterns match at least a portion of the deposit information;

generate an indication of the identified one or more deposit patterns; and provide or offer, based at least in part on the indication of the identified one or more deposit patterns, one or more services associated with the financial institution customer.

16. The system of claim 15, wherein the deposit information further specifies a respective count for each of the plurality of deposit amounts, wherein the respective count indicates a number of transactions received on the respective date, and wherein the at least one processor is configured to apply the one or more predefined template patterns by:

determining that a first template pattern of the one or more applied predefined template patterns matches at least a portion of the deposit information;

modifying the deposit information by reducing the respective count for each deposit amount matched by the first template pattern; and determining that a second template pattern of the one or more applied predefined template patterns matches the at least a portion of the modified deposit information.

17. The system of claim 15, wherein the deposit information includes electronic deposit information associated with a plurality of deposits that were deposited electronically.

18. The system of claim 15, wherein prior to applying one or more predefined template patterns, the at least one processor is further configured to adjust the one or more predefined template patterns based upon one or both of weekend or holiday dates.

19. The system of claim 15, wherein the one or more predefined template patterns comprise one or more quarterly template patterns, monthly template patterns, semi-monthly template patterns, bi-weekly template patterns, or weekly template patterns.

20. The system of claim 19, wherein the one or more weekly template patterns comprise a plurality of weekly template patterns, wherein each of the weekly template patterns begins on a respective day of a week.

21. The system of claim 15, wherein the generated indication of the identified one or more deposit patterns includes one or more of the following: (i) an identification of the one or more deposit patterns, (ii) an amount of a future deposit, or (iii) a date or a date range of a future deposit.

22. The system of claim 21, wherein the generated indication that includes the date or the date range of the future deposit is compared to future deposit information to determine an interruption of at least one of the identified one or more deposit patterns.

23. The system of claim 15, wherein the one or more services are associated with at least one of: (i) approving a loan or a credit line for the financial institution customer; (ii) increasing or reducing an amount of the loan or the credit line for the financial institution customer, (iii) determining a due date or a payment schedule for the loan or the credit line for the financial institution customer; or (iv) determining when to contact the financial institution customer for collections or an offering.

24. The system of claim 15, wherein the one or more predefined template patterns are applied according to one or more parameters, wherein the parameters are associated with one or more of: (i) a maximum allowable interval between a scheduled deposit date in a particular one of the one or more predefined template pattern and an actual deposit date; or (ii) a minimum number of scheduled deposit dates in a particular one of the one or more predefined template pattern that must correspond to an actual deposit date in order for the particular one of the one or more predefined template pattern to be considered a matching predefined template pattern.

25. The system of claim 15, wherein a predefined template pattern is determined to match based upon a predetermined number of expected deposits in the predefined template pattern corresponding to actual deposits in at least a portion of the deposit information.

26. The system of claim 15, wherein the one or more predefined template patterns comprise a plurality of predefined template patterns, wherein the plurality of predefined template patterns are prioritized according to a respective frequency interval associated with each of the plurality of predefined template patterns, wherein the prioritization is utilized by the at least one processor in determining an order in which to apply the plurality of predefined template patterns to the deposit information.

27. The system of claim 15, wherein the processor is configured to receive the deposit information from a financial institution computer, and wherein the processor is configured to provide the generated indication of the identified one or more deposit patterns to a financial services computer.

28. The system of claim 27, wherein the financial institution computer and the financial services computer are (i) associated with a same entity, or (ii) are a same computer.

29. The method of claim 1, wherein the financial system is provided by at least one of: (i) the service provider, or (ii) a financial institution.

30. The method of claim 1, wherein the one or more services are provided or offered to the financial institution customer by at least one of: (i) the financial system, (ii) the service provider, or (iii) a financial institution.

31. The system of claim 15, wherein the one or more services are provided or offered to the financial institution customer by at least one of: (i) a financial system; (ii) a service provider; or (iii) a financial institution.

\* \* \* \* \*